(12) United States Patent
Huston

(10) Patent No.: US 8,196,204 B2
(45) Date of Patent: Jun. 5, 2012

(54) ACTIVE COMPUTER SYSTEM DEFENSE TECHNOLOGY

(76) Inventor: Lawrence Brent Huston, Lancaster, OH (US)

( * ) Notice: Subject to any disclaimer, the term of this patent is extended or adjusted under 35 U.S.C. 154(b) by 976 days.

(21) Appl. No.: 12/117,097

(22) Filed: May 8, 2008

(65) Prior Publication Data
US 2009/0282482 A1 Nov. 12, 2009

(51) Int. Cl.
*G06F 11/00* (2006.01)
(52) U.S. Cl. ............... 726/23; 726/22; 726/24; 726/25; 726/26; 713/188; 713/201; 709/224; 709/228
(58) Field of Classification Search .............. 713/172; 726/22, 23, 26; 709/224; 370/390
See application file for complete search history.

(56) References Cited

U.S. PATENT DOCUMENTS

| | | | |
|---|---|---|---|
| 6,363,489 | B1 | 3/2002 | Comay et al. |
| 7,089,303 | B2 | 8/2006 | Sheymov et al. |
| 7,913,303 | B1 * | 3/2011 | Rouland et al. ............... 726/23 |
| 2003/0217283 | A1 * | 11/2003 | Hrastar et al. ............... 713/200 |
| 2004/0103314 | A1 * | 5/2004 | Liston ........................... 713/201 |
| 2004/0128536 | A1 * | 7/2004 | Elzam et al. .................. 713/201 |
| 2004/0218602 | A1 * | 11/2004 | Hrastar ........................ 370/390 |
| 2007/0094741 | A1 | 4/2007 | Lynn et al. |
| 2007/0180522 | A1 * | 8/2007 | Bagnall ........................ 726/22 |

FOREIGN PATENT DOCUMENTS

| | | |
|---|---|---|
| EP | 1 244 967 | 8/2008 |
| JP | 11110211 | 9/1997 |
| WO | WO 2006/071486 | 7/2006 |

OTHER PUBLICATIONS

"Worm Detection Using Intelligent Agents"; Salah M. Hussein1 et al, Faculty of Computers & Information, Cairo University, Egypt; Informatics and Systems (INFOS), 2010 The 7th International Conference, Issue Date: Mar. 2010 IEEE.*
Castaneda, F. et al., "Worm vs. Worm: Preliminary Study of an Active Counter-Attack Mechanism," Department of Computer Science, North Carolina University (2004).
Holdaway, E., "Active Computer Network Defense: an Assessment," Air Command and Staff College—Air University (Apr. 2001).
JP 11110211 Abstract.
Singel, R., "Security Guru Gives Hackers a Taste of Their Own," http://blog.wired.com/27bstroke6/2008/04/researcher-demo.html, (Apr. 14, 2008) pp. 1-6.

* cited by examiner

*Primary Examiner* — Taghi Arani
*Assistant Examiner* — Jason Lee
(74) *Attorney, Agent, or Firm* — Frost Brown Todd LLC

(57) ABSTRACT

Active computer system defense techniques can include sending disruptive communications to attackers, where the disruptive communications include random data elements which could potentially interfere with the operation of an attacking system. Such computer system defense techniques can also be augmented to automatically optimize the disruptive communications sent to the attackers.

15 Claims, 4 Drawing Sheets

HTTP/1.0 0x1000 .1024d

101 → Date: Fri, 256 %s%s%s%s%s%s%s%s%s%s%s 65536: 1073741823: 2147483648 %%20n
         ↑
         103

Server: %9999999999s

Connection: close%s%p%x%d

Content-Type: text/html; charset=%%20s-0x7fffffff

<html>
<body>
Under Construction...
</body>
</html>
}
102 →

Figure 1a

HTTP/###.### ### $$$

101 ⟶ Date: Fri, ### $$$ ### ###:###:### $$$
           ↑    ↑
          104  105

Server: $$$

Connection: close$$$

Content-Type: text/html; charset=$$$-###

102 → { <html>

<body>
Under Construction...
</body>

</html> }

Figure 1b

ACTIVE COMPUTER SYSTEM DEFENSE TECHNOLOGY

FIELD OF THE INVENTION

Aspects of the inventors' technology can be implemented to protect computer systems from attacks by malicious outside parties.

BACKGROUND

Whether in the form of network scanning tools, bot-net infectors, viruses or worms, attacks against computer systems represent a significant threat which must be considered and countered by any business which uses this type of technology. Unfortunately, prior art methods for dealing with these attacks have several undesirable features. For example, many of these methods (e.g., anti-virus scanners) are purely passive, seeking to detect and block attacks against a system. While detecting and blocking attacks is valuable, it does not interfere with the operation of an attacker, or prevent the attacker from targeting other, potentially more vulnerable, machines on a network. Accordingly, there is a need in the art for an improved computer system defense tool which addresses one or more of the deficiencies found in the prior art.

SUMMARY

As will be clear to one of ordinary skill in the art in light of this disclosure, there are a variety of methods, machines, manufactures and compositions of matter which can be practiced or created to provide active computer system defense. For example, in light of the teachings set forth herein, one of ordinary skill in the art could make and use a computer readable medium having stored thereon a set of data operable to configure a computer system to receive a malicious communication from an attacker. In some cases, the data stored on the computer readable medium could also be operable to configure the computer to determine and send a disruptive communication to the attacker in response to receiving the malicious communication from the attacker.

For the purpose of clarity, certain terms used in the description above should be understood as having specific meanings in the context of this application. For example, a "computer readable medium" should be understood to mean any object, substance, or combination of objects or substances, capable of storing data or instructions in a form in which they can be retrieved and/or processed by a device. A "computer readable medium" should not be limited to any particular type or organization, and should be understood to include distributed and decentralized systems however they are physically or logically disposed, as well as storage objects of systems which are located in a defined and/or circumscribed physical and/or logical space. By way of example, both a CD-ROM which could be used to distribute software, and RAM memory which could store information while a computer is operating would fall within the scope of a "computer readable medium." Similarly, "data" should be understood to refer to information which is represented in a form which is capable of being processed, stored and/or transmitted. A "computer system" should be understood to mean a group of related computer components susceptible to being treated as a single entity. Examples of computer systems include individual computers and computer networks. To "configure" a computer system should be understood to mean providing the computer system with specific data (which may include instructions) which can be used in performing the specific acts the computer system is being "configured" to do. So, for example, installing Microsoft WORD on a computer system which comprises a single computer "configures" that computer system to function as a word processor, which it does using the instructions for Microsoft WORD in combination with other inputs, such as an operating system, and various peripherals (e.g., a keyboard, monitor, etc.).

Turning now to the acts mentioned above which the computer system might be configured to perform, receiving a "malicious communication" should be understood to refer to receiving a communication seeking unauthorized interaction or access (e.g., a set of data sent by a party seeking to install a worm or virus on a computer system). When a malicious communication is received from an "attacker," it should be understood to mean that malicious communication is received from an entity who engages in unauthorized interactions. Examples of "attackers" include an authorized user of a computer system who seeks to access portions of the system beyond those for which the user is authorized, an outside hacker attempting to compromise a computer system, a program which seeks to perform an unauthorized operation (e.g., a bot-net infector) or some other type of individual or entity. The next act described, "determining" a disruptive communication, should be understood to refer to the act of generating, selecting or otherwise specifying the disruptive communication. The "disruptive communication" should be understood to refer to a communication comprising a plurality of data elements, at least one of which malformed. A "data element" should be understood to mean a unit of data which is treated as a distinct entity, while a "malformed data element" should be understood to be a data element having characteristics inconsistent with those which are expected. For example, if a program asks a user to input a month, and instead the user inputs "glrmph," "glrmph" would be a malformed data element. Similarly, if a program asks a user to input a number, and the program stores that number in a 16 bit memory location, if the user enters a 17 bit number, the 17 bit number would be a "malformed data element." As yet another example, if a program asks a user to input an equation to be evaluated, and the user inputs an equation which may cause an error in the program (e.g., 1/0), then the equation provided by the user is a "malformed data element."

Of course, it should be understood that the description above of acts which data stored on a computer readable medium could configure a computer system to perform is not intended to be exhaustive, and that other acts could also be used in implementations of active computer system defense. For example, in some cases a set of data stored on a computer readable medium could also configure a computer system to load certain information. Such information could include a plurality of data element libraries and a disruptive communication template. Further, in some cases, the disruptive communication template could comprise one or more placeholder data entries, and each of which could identify a corresponding data element library. In such a case, where a plurality of data element libraries and a disruptive communication template had been loaded, if the computer system is also configured to determine a disruptive communication, determining the disruptive communication might comprise, for each placeholder data entry in the disruptive communication template, adding a data element to the disruptive communication. In some cases, the data element added to the disruptive communication could be randomly selected from the data element library corresponding to the placeholder data entry.

For the purpose of clarity, certain terms used in the above communication should be understood as having particular meanings. For example, a "data element library" should be understood to mean a collection of data elements having a common characteristic. For example, a collection of data elements where each of the data elements is a string, or a collection of data elements where each data element is selected to interfere with an attacking system would both be examples of a "data element library." Similarly, a "disruptive communication template" should be understood to be a data structure which serves as a pattern or framework for determining a disruptive communication. When a disruptive communication template comprises a plurality of "placeholder data entries," it should be understood that the disruptive communication template comprises a plurality of locations where a data element can be placed.

Further variations and refinements on computer readable media such as described above are also possible. For example, in some cases where a computer system is configured to load a disruptive communication template comprising one or more placeholder data entries, the placeholder data entries might correspond to locations in the application layer of the disruptive communication (or to locations within the protocol layer of the application layer). Also, in some cases the set of data stored on the computer readable medium might be operable to configure the computer system to send only one disruptive communication to the attacker in response to receiving the malicious communication. Further, in some cases, sending the disruptive communication to the attacker could interfere with an operation pattern for the attacker in more than 75% of malicious communications. For the sake of understanding, the term "application layer" when used in this application should be understood as being synonymous with the "application layer" in the Open Systems Interconnection (OSI) reference model. Similarly, the "protocol layer" should be understood to refer to an identifiable segment of a communication comprising information exchanged between entities of a given layer, via the service provided by a lower layer, to coordinate those entities' joint operation. By way of explanation of this last variation, an "operation pattern" should be understood to refer to a recognizable and predictable series of acts. As an example of interfering with an "operation pattern," if an attacker is observed to send malicious communications to each device in a computer system, and a device sends a disruptive communication to the attacker which causes a system crash which prevents the attacker from sending any further malicious communications, the disruptive communication would have interfered with the "operation pattern" of the attacker. Of course, other types of interference, such as causing delays, causing an attacker to switch to a secondary mode of operation, or others are also possible. Accordingly, the example above should be understood as being illustrative only, and not limiting.

Of course, the teachings of this disclosure are not limited to being implemented in the form of computer readable media storing data operable to configure a computer, as described above. It is also possible that the teachings of this disclosure could be used to practice various methods as well. For example, based on this disclosure, one of ordinary skill in the art could perform a method comprising the steps of receiving a malicious communication from an attacker, responding by determining a disruptive communication to send to the attacker, then sending the disruptive communication to the attacker. In some cases, such a method might also comprise detecting whether the disruptive communication interferes with an operation pattern for the attacker. For example, if the operation pattern for the attacker comprises sending a first malicious communication to a first device in a computer system, and sending a second malicious communication to a second device in the computer system, detecting whether the disruptive communication interferes with the operation pattern might comprise detecting whether the attacker sends a third malicious communication to a third device in the computer system.

Certain methods which could be practiced based on this disclosure could also include loading and selection steps similar to what was described above regarding acts which could be performed by a computer system. For example, a method performed based on the disclosure set forth herein could include loading a plurality of data element libraries and a disruptive communication template comprising a plurality of placeholder data entries. In such a case, the step of determining a disruptive communication to send to the attacker could comprise adding a randomly selected data element from the data element libraries to the disruptive communication. This step of adding a randomly selected data element could itself comprise using a nondeterministic function (i.e., a function which has the potential to return different results when run multiple times using the same input) to select the data element from the corresponding data element library. In such a case, the method might also include a step of modifying the nondeterministic function in response to detecting whether the disruptive communication interferes with the operation pattern for the attacker. Such a modification might comprise modifying the function so that the likelihood of selecting at least one data element from the disruptive communication during random selection from the corresponding data element library is increased.

Of course, other steps could be taken in response to detecting whether a disruptive communication interferes with an operation pattern of an attacker either in addition to, or as an alternative to, one or more of the steps described above. For example, in some cases, if a disruptive communication does not interfere with the operation pattern, then the data element libraries might be modified by removing at least one data element which had been added to the disruptive communication. Similarly, in some cases, if the disruptive communication does interfere with the operation pattern, then the data element libraries might be modified by adding at least one data element based on the disruptive communication (e.g., adding a duplicate to the data element libraries for one of the data elements from the disruptive communication. It is also possible that, in addition to detecting whether a disruptive communication interferes with an operation pattern, a method such as described above might include determining an operation pattern for an attacker, for example, by using techniques comprising sending an innocuous communication to the attacker.

Of course, it should be understood that the methods and computer readable media described above are provided as an illustration only of potential implementations of the teachings of this application. Additional computer readable media, methods, systems, and other types of implementation could similarly be practiced by those of ordinary skill in the art in light of this disclosure. Accordingly, the discussion above should be understood to be illustrative only, and not limiting.

BRIEF DESCRIPTION OF THE DRAWINGS

FIG. 1a depicts a communication which could be sent to an attacking system.

FIG. 1b depicts a template which could be used to generate a communication to be sent to an attacking system.

DETAILED DESCRIPTION

Figure 2:
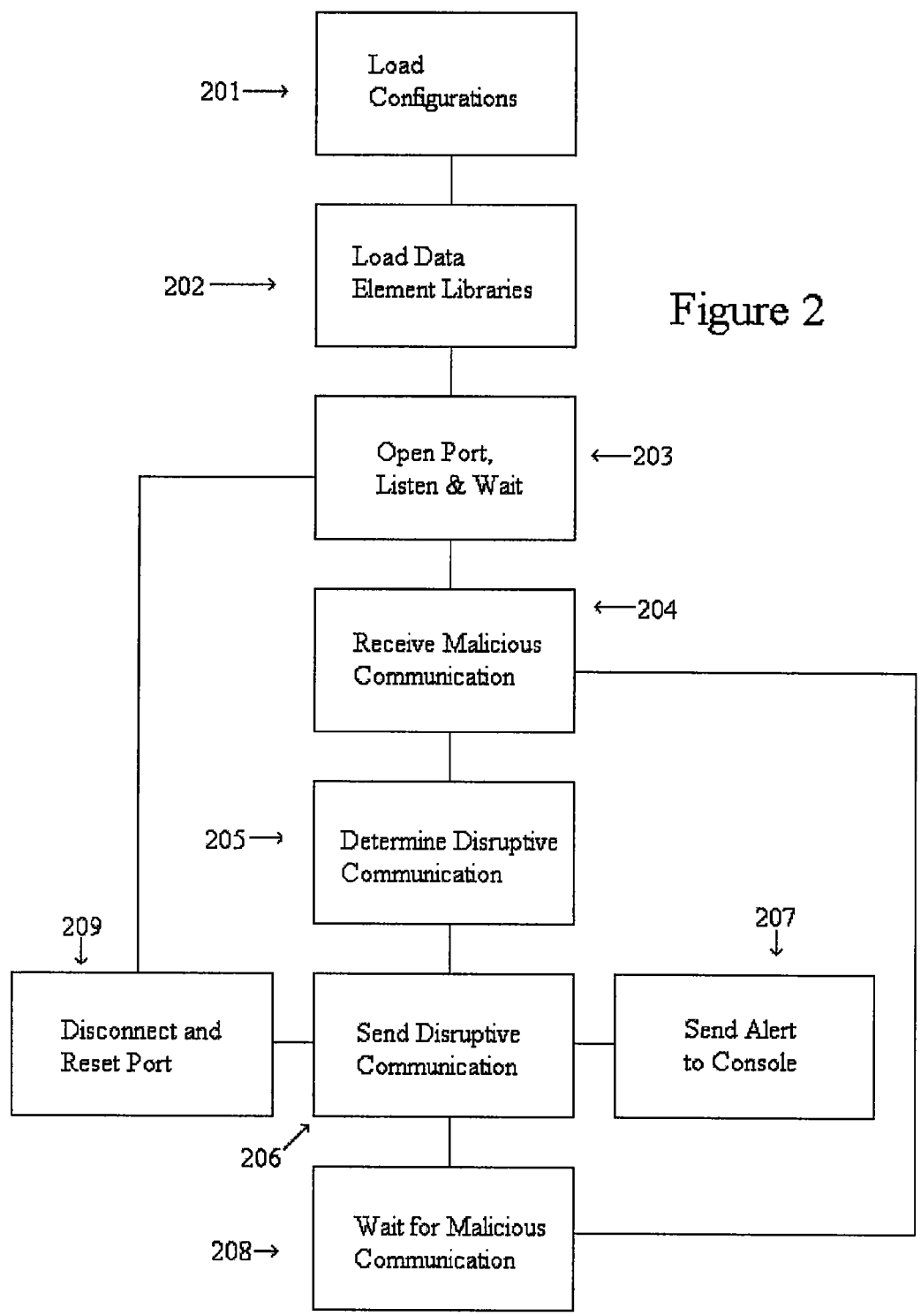
FIG. 2 depicts a flow chart of steps which could be used in active computer system defense.

Described herein are techniques which can be used for active computer system defense. While the techniques for active computer system defense are described in detail in terms of specific implementations, this disclosure is not intended to indicate limits on the potential implementations contemplated by the inventor. Instead, the inventor's invention should be understood to extend to the full scope of the terms of the claims included in this application, or any related application when given their ordinary meaning as shown by a general purpose dictionary and any special definitions explicitly set forth in the summary section above, as well as any equivalents thereof. Accordingly, this disclosure should be understood as being illustrative only, and not limiting.

Turning now to potential techniques for implementing active computer system defense, one approach is to send communications to attackers where the communications interfere with the operation of the attacker's system. Such communications can be generated in a variety of manners, for example, by creating communications having format and syntax which appear to be innocuous, but which include specific data elements which could interfere with an attacker's system. As an example of this, consider the communication depicted in FIG. 1a. In FIG. 1a, the depicted communication includes HTTP header field information, including a "Date" header field [101], and an HTML payload [102] which an attacker might expect to receive after establishing a connection with an HTTP port. However, in addition to the HTTP header field information and HTML payload [102], the communication of FIG. 1a also includes several potentially malformed data elements, for example, the data element [103] in the day position of the "Date" header field [101]. When an attacker receives a communication including potentially malformed data elements such as shown in FIG. 1a, the malformed data elements could interfere with the attacker, potentially causing a crash. For example, if an attacker does not check the data elements in communications it receives, then a malformed data element might cause a buffer overrun, which could have unpredictable, and potentially negative effects on the attacker.

To understand a technique for how communications such as shown in FIG. 1a could be generated, consider the diagram of FIG. 1b. FIG. 1b, like FIG. 1a, includes HTTP header field information (e.g., the "Date" header field [101]) and an HTML payload [102] such as might be sent in response to connecting to an HTTP port. However, unlike FIG. 1a, which included individual malformed data elements, FIG. 1b includes placeholder data entries where data elements such as shown in FIG. 1a might be inserted. For example, in the diagram of FIG. 1b, in the day position in the "Date" header field [101], instead of a numeric data element such as depicted in FIG. 1a, there is a set of hash marks [104]. Such a set of hash marks [104] could be used, for example, to instruct a computer program that a numeric data element should be inserted into a communication in the location indicated by the hash marks [104]. Similarly, in FIG. 1b, instead of a data element in the month position of the "Date" header field [101], there is a set of currency indicators [105]. Such a set of currency indicators [105] could be used, for example, to instruct a computer program that a string data element should be inserted into a communication in the location indicated by the currency indicators [105]. Accordingly, a set of information such as depicted in FIG. 1b could be used as a template for generating communications such as shown in FIG. 1a. For example, a template such as shown in FIG. 1b could be used along with one or more data element libraries from which data elements could be randomly selected to generate an enormous number of potential communications which could be sent to attackers. In such a scenario, when a connection is established by an attacker, a computer program could generate a communication to send back to the attacker by randomly inserting elements from string or numeric element libraries into the template of FIG. 1b (as indicated by the hash marks and currency indicators).

Turning now to table 1, that table depicts two potential data element libraries which could be used in the generation of communications such as described above with respect to FIGS. 1a and 1b.

TABLE 1

Data Elements Which Could be Used in Generating Communications

| Data Element Set 1: Number Based | Data Element Set 2: String Based |
|---|---|
| "1", "0", "0x100", "0x1000", "0x3ffffff", "0x7fffffe", "0x7ffffff", "0x80000000", "0xfffffe", "0xffffffff", "0x1000", "0x10000", "256", "4096", "1073741823", "2147483646", "2147483647", "2147483648", "4294967294", "4294967295", "65536" | "%s%p%x%d", ".1024d", "%.2049d", "%p%p%p%p", "%x%x%x%x", "%d%d%d%d", "%s%s%s%s", "%999999999999s", "%08x", "%%20d", "%%20n", "%%20x", "%%20s", "%s%s%s%s%s%s%s%s%s%s", "%p%p%p%p%p%p%p%p%p%p" |

Data element libraries such as shown in table 1 could be generated in a variety of manners. For example, the data element libraries could be determined by collecting data elements would include data elements which would trigger certain common types of errors in attacking systems, such as integer errors (e.g., data elements which cause arithmetic operations having results that a program cannot handle), buffer overflow errors (e.g., data elements which expand beyond the storage limits for a program's input), or format string vulnerabilities (e.g., data elements which include tokens (which may be language specific) that can cause a program which does not filter user input to crash). As an alternative, the data elements could be taken from a larger data set of random values which had been screened to identify values which are most effective in interfering with operation patterns for attackers. Of course, it should be understood that the described alternatives, data element libraries and techniques for generating those libraries are intended to be illustrative only, and that other variations are contemplated by the inventor and could be implemented by one of ordinary skill in the art without undue experimentation. As an example of such a variation, while the description above focused on data element libraries (number based and string based), it is possible that some implementations might have additional libraries which could be used as well (e.g., a data elements library which is used specifically for random input to a date field in a communication). Accordingly, the discussion set forth herein should not be treated as limiting on the claims of either this, or any related application.

A flow chart of a set of steps which could be followed to perform active computer system defense using random communication generation such as described above is set forth in FIG. 2. In FIG. 2, the first step depicted is to load configurations [201]. Such a step could include, for example, loading information which would enable a computer system to identify incoming malicious communications. For example, the information loaded might include indications of a service to emulate, and a port to listen on for malicious communications. Then connections which were made with the port emulating the service would be classified as malicious communication. Additionally, loading configurations [201] might include loading information which instructs the computer system how to act when a malicious communication is detected, for example, what information to record about that communication, how to report the information, etc. After the configurations are loaded [201], the process depicted in FIG. 2 then proceeds to the step of loading data element libraries [202]. This step can comprise loading one or more templates, such as shown in FIG. 1b, along with libraries of data elements which could be inserted into those templates, as described above and shown in FIG. 1a. With the configurations and libraries loaded, the system is ready to generate and provide communications to attackers, and therefore opens the appropriate port, listens for incoming connections, and waits [203].

Continuing with the discussion of FIG. 2, the chain of events which could lead to generation of a message such as discussed above and shown in FIG. 1a could be started when a malicious communication is received from an attacker [204]. When the malicious communication is received from an attacker [204], the system would determine a disruptive communication [205], for example, a communication including random data elements taken from the information loaded in the step of loading the data element libraries [202]. The disruptive communication would then be sent back to the attacker [206]. Additionally, in some implementations, an alert might be sent to a console [207], potentially informing an administrator about the attack, and including information (e.g., date/time of the attack) as might have been specified in the information loaded in the loading configurations step [201]. After the disruptive response had been sent [206], a system following the flowchart of FIG. 2 could then wait for additional malicious communications from the attacker [208], or could disconnect from the attacker and reset the port where the malicious communication had been received [209]. The determination of whether to wait for additional malicious communications [208], or to disconnect and reset the port [209] can be based on a variety of factors, including information which was loaded during the loading configurations step [201] performed previously. Of course, other variations (e.g., determining whether to wait [208] or disconnect [209] based on the type of attack, or based on input from an administrator) could also be implemented. Accordingly, the sequence of events depicted in FIG. 2 should be understood to be illustrative only of a potential implementation of active computer system defense, and should not be treated as limiting on the scope of potential implementations of this disclosure which are contemplated by the inventors or which could be implemented by one of ordinary skill without undue experimentation.

As an example of another aspect of active computer system defense which could be implemented in some instances, consider the possibility of configuring a system to detect whether disruptive communications such as described above effectively interfered with the operation of an attacker. As an example of how such a configuration could take place, consider the flowchart of FIG. 3. In that flowchart, the sequence for detecting whether a disruptive communication interferes with the operation of an attacker starts with the system listening for a malicious communication [301]. Once a malicious communication is received [302], the system then tries to determine an operation pattern for the attacker [303]. If the operation pattern is not successfully determined, then the system could send an innocuous communication [305] (e.g., a response such as might be sent to an authorized user), then listen for further malicious communications [301], essentially continuing to gather data before sending a disruptive communication. As an example of how this data gathering might take place, consider a system comprising multiple devices configured to detect attacks (e.g., systems configured to emulate network services which are exposed to potential attackers but not to legitimate users). In such a case, if an attacker is scanning a network by connecting with one device after another, the system could detect the attacker's operation pattern as being one where devices are contacted one after another. As an alternative, the system might detect that the attacker repeats certain sequences of requests to the attack detectors (e.g., first request a connection, then request one type of data, then request a second type of data, etc). In that case, the system could detect that the attacker's operation pattern is one of sequential requests to a particular machine. As yet another alternative, the system might include a library of common operation patterns, and match an attacker's malicious communication with one of the operation patterns stored in the library. Still other techniques for determining operation patterns could also be employed. Thus, the techniques described above should be understood as being exemplary only, and not limiting on the scope of claims included in this application, or any related application.

Figure 3:
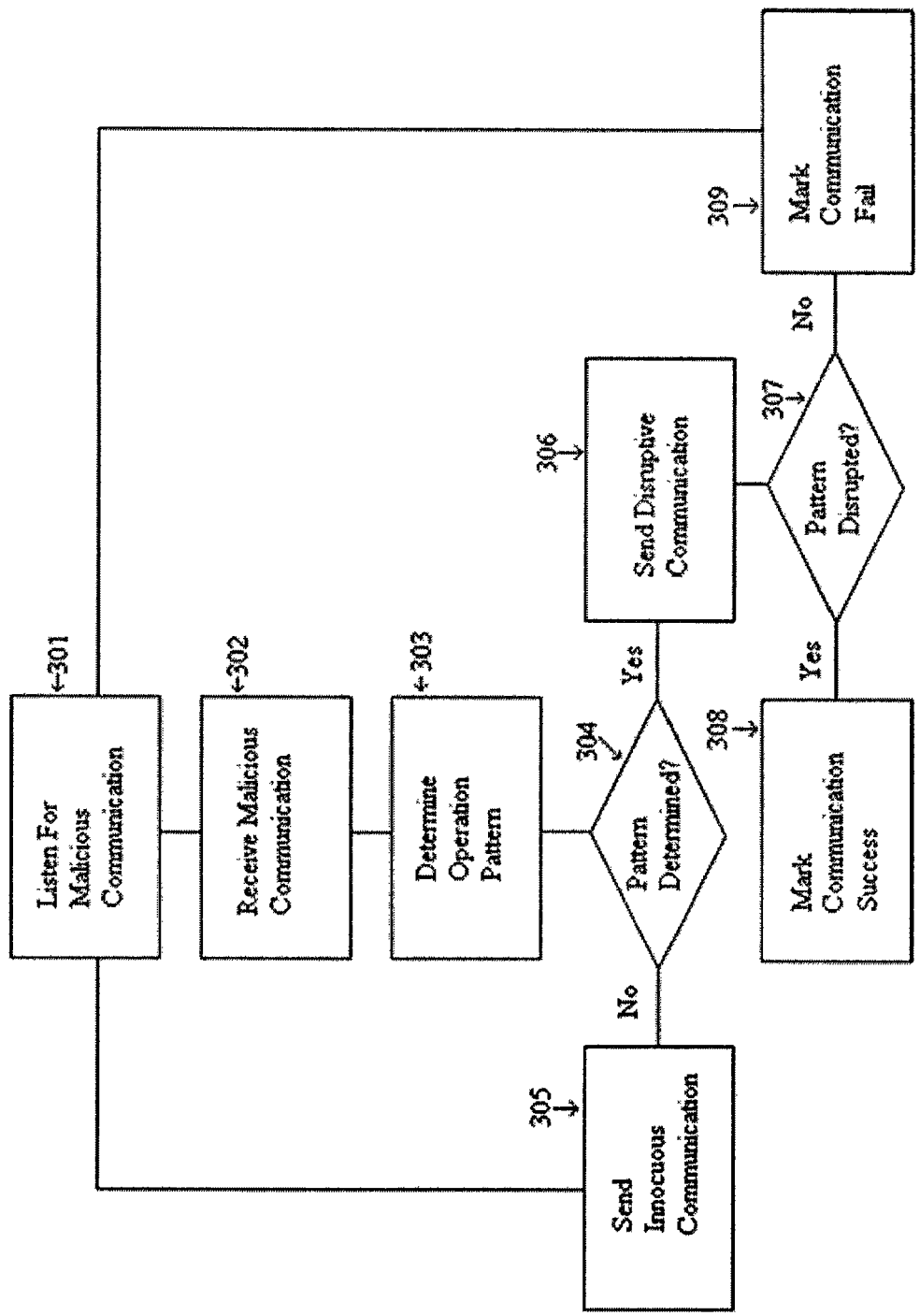
FIG. 3 depicts a flow chart of steps which can be used to determine the effect of a disruptive communication on an attacking system.

Returning now to the sequence shown in FIG. 3, once an operation pattern is determined, the system can send a disruptive communication [306], for example, a response including random data elements such as described above with regard to FIGS. 1a and 1b. The system could then check to see if the pattern was disrupted [307]. For example, if the operation pattern was that the attacker established a connection with one device after another in the system, if the attacker ceased attempting to establish connections after the disruptive communication was sent, then the system would determine that the pattern was successfully disrupted. If that was the case, the system could then mark that particular disruptive communication as being successful [308]. Otherwise, the system would mark the disruptive communication as having failed [309], and would return to listening for malicious communications [301]. Of course, the technique described above should be understood as being illustrative only, and not limiting on techniques for detecting the effect of a disruptive communication on an attacker. For example, another technique for detecting the operation of a disruptive communication on an attacker is to stage a controlled attack, and then observe the effect on the attacking system directly. This could take place, for instance, by having a testing machine which is configured to send disruptive communications, then using known attack tools to try and compromise that machine. In this case, the effect of the disruptive communications could be observed directly simply by watching the operation of the machine which was running the known attack tools. Other variations are also possible. Accordingly, the techniques described herein for detecting the effect of a disruptive communication on an attacker should be understood as being illustrative only, and not limiting on any claims included in this application, or in other applications claiming the benefit of this application.

Information gleaned by detecting the effect of a disruptive communication on an attacking system can be used for a variety of purposes. For example, in some cases, a vendor might have promoted a system using techniques such as described above as disrupting the operation of a certain level of attackers. In such a case, techniques such as described above can be used to provide valuable metrics to support the performance claims of the vendor. As another potential application, detection of what disruptive communications are most effective can be used to optimize the system's operation. For example, if a certain data element was found to be particularly effective in disrupting attackers, then the algorithms which determine what data elements to insert into disruptive communications could automatically increase the likelihood that that data element would be included. Similarly, in some cases a system could record information about a specific type of attack which was launched, and what disruptive communication thwarted that attack, allowing message optimization to take place for specific attacks as an alternative to (or in addition to) optimizing messages on a global level.

It is also possible that, as an alternative to (or complement to) focusing on the operation of an active computer system defense tool in a production environment, information about the effect of disruptive communications on attackers could also be used in the development of computer system defense tools. For example, the automatic optimization techniques described above could be used in a development environment to determine the best templates and data elements to use when a computer system defense tool is actually put into production. Similarly, a vendor might use one or more of the techniques described above to perform benchmarking analysis, or to determine what types of claims to make to potential customers, before deployment to a production environment.

As set forth repeatedly in the course of this disclosure, the techniques and information set forth herein are intended to be illustrative only, and should not be treated as exhaustively listing each potential implementation teachings set forth herein which is contemplated by the inventors, or which could be implemented by one of ordinary skill in the art without undue experimentation. For example, while the disruptive communications depicted in and discussed in relation to FIGS. 1a and 1b included data elements in HTTP headers, not all disruptive communications are so focused. For example, in some instances a system might include a device which emulates a database service, in which case disruptive communications sent by that device could insert potentially disruptive data elements into database communications, rather than in HTTP communications as described previously. Similarly, disruptive communications could be created by inserting random data elements into different portions of a communication (e.g., into an HTML payload [102], or into a different layer of the communication, such as the network layer, or session layer). Further variations are also possible. Accordingly, the disclosure set forth herein should be treated as being illustrative only, and should not be used to imply limitations in any claims included in this application, or any application claiming the benefit of this application.

I claim:

1. A non-transitory computer readable medium having stored thereon a set of data operable to configure a computer system to perform a set of acts comprising:
 a. receiving a malicious communication from an attacker;
 b. loading:
  i. a plurality of data element libraries; and
  ii. a disruptive communication template, the disruptive communication template comprising one or more placeholder data entries, each of the placeholder data entries identifying a corresponding data element library from the plurality of data element libraries;
 c. in response to receiving the malicious communication, determining a disruptive communication to send to the attacker, wherein determining the disruptive communication to send to the attacker comprises, for each placeholder data entry in the disruptive communication template, adding a data element from the corresponding data element library to the disruptive communication; and
 d. sending the disruptive communication to the attacker;
 e. detecting whether the disruptive communication interferes with an operation pattern for the attacker;
 wherein the operation pattern for the attacker comprises:
  i. sending a first malicious communication to a first device in a computer system; and,
  ii. sending a second malicious communication to a second device in the computer system; and
 wherein detecting whether the disruptive communication interferes with the operation pattern comprises detecting whether the attacker sends a third malicious communication to a third device in the computer system.

2. The non-transitory computer readable medium of claim 1, wherein adding the data element from the corresponding data element library to the disruptive communication comprise adding a randomly selected data element from the corresponding data element library to the disruptive communication.

3. The non-transitory computer readable medium of claim 2, wherein the placeholder data entries correspond to location in the application layer of the disruptive communication.

4. The non-transitory computer readable medium of claim 3, wherein the placeholder data entries correspond to locations in the protocol layer of the disruptive communication.

5. The non-transitory computer readable medium of claim 4, wherein the set of data is operable to configure the computer system to send only one disruptive communication to the attacker in response to receiving the malicious communication.

6. The computer readable medium of claim 1 wherein sending the disruptive communication to the attacker interferes with an operation pattern for the attacker in more than 75% of malicious communications.

7. A method comprising:
 a. receiving a malicious communication from an attacker;
 b. loading, into a memory of a computer:
  i. a plurality of data element libraries; and
  ii. a disruptive communication template, the disruptive communication template comprising one or more placeholder data entries, each of the placeholder data entries identifying a corresponding data element library from the plurality of data element libraries;
 c. in response to receiving the malicious communication, determining a disruptive communication to send to the attacker, wherein determining the disruptive communication to send to the attacker comprises, for each placeholder data entry in the disruptive communication template, adding a data element from the corresponding data element library to the disruptive communication;
 d. sending the disruptive communication to the attacker; and
 e. detecting whether the disruptive communication interferes with an operation pattern for the attacker;
 wherein the operation pattern for the attacker comprises:

i. sending a first malicious communication to a first device in a computer system; and, ii. sending a second malicious communication to a second device in the computer system; and wherein detecting whether the disruptive communication interferes with the operation pattern comprises detecting whether the attacker sends a third malicious communication to a third device in the computer system.

8. The method of claim 7 wherein adding the data element from the corresponding data element library to the disruptive communication comprises adding a randomly selected data element from the corresponding data element library to the disruptive communication.

9. The method of claim 8 wherein adding a randomly selected data element from the corresponding data element library to the disruptive communication comprises using a nondeterministic function to select the data element from the corresponding data element library; and wherein the method comprises, in response to detecting whether the disruptive communication interferes with the operation pattern, modifying the nondeterministic function to increase a likelihood of selecting at least one data element from the disruptive communication during random selection from the corresponding data element library.

10. The method of claim 8 comprising, in response to detecting that the disruptive communication does not interfere with the operation pattern, modifying the plurality of data elements libraries by removing at least one data element which had been added to the disruptive communication.

11. The method of claim 7 comprising determining the operation pattern for the attacker, wherein determining the operation pattern for the attacker comprises sending an innocuous communication to the attacker.

12. A method comprising:
a. receiving a malicious communication from an attacker;
b. loading, into a memory of a computer, a plurality of data element libraries, wherein each data element library comprises one or more malformed data elements; and
c. loading, into the memory of a computer, a disruptive communication template, wherein:
  i. the disruptive communication template comprises one or more placeholder data entries;
  ii. each of the placeholder data entries corresponds to a data element library from the plurality of data element libraries;
d. using a processor of the computer, creating a disruptive communication from the disruptive communication template, wherein:
  i. the disruptive communication is organized into a plurality of layers;
  ii. the disruptive communication is created from the disruptive communication template by performing steps comprising adding a malformed data element from a data element library to a corresponding placeholder data entry from the disruptive communication template; and
  iii. the corresponding placeholder data entry into which the malformed data element is added is located in the application layer of the disruptive communication as defined by the Open Systems Interconnect model; and
e. sending the disruptive communication to the attacker;
wherein:
i. the malicious communication is received at a first device in a computer system;
ii. the method further comprises detecting whether the disruptive communication interferes with an operation pattern for the attacker by detecting whether the attacker sends a second malicious communication to a second device in the computer system after the disruptive communication has been sent to the attacker.

13. The method of claim 12, further comprising
in response to determining that the disruptive communication does not interfere with the operation pattern, modifying the corresponding data elements library by removing the malformed data element.

14. The method of claim 12, further comprising
based on whether the disruptive communication interferes with the operation pattern for the attacker, modifying a function used in selecting malformed data elements to be added to disruptive communications.

15. The method of claim 12, wherein sending the disruptive communication to the attacker interferes with an operation pattern for the attacker in more than 75% of malicious communications.

* * * * *